United States Patent
Battlogg

(10) Patent No.: US 6,802,287 B2
(45) Date of Patent: Oct. 12, 2004

(54) VALVE MECHANISM, IN PARTICULAR FOR INTERNAL COMBUSTION ENGINES

(76) Inventor: Stefan Battlogg, Haus Nr. 166, A-6771, St. Anton/Montafon (AT)

(*) Notice: Subject to any disclaimer, the term of this patent is extended or adjusted under 35 U.S.C. 154(b) by 0 days.

(21) Appl. No.: 10/213,625

(22) Filed: Aug. 6, 2002

(65) Prior Publication Data

US 2002/0185092 A1 Dec. 12, 2002

Related U.S. Application Data

(63) Continuation-in-part of application No. 10/075,066, filed on Feb. 12, 2002, now abandoned, which is a continuation of application No. PCT/AT00/00215, filed on Aug. 8, 2000.

(30) Foreign Application Priority Data

Aug. 12, 1999 (WO) ............................... PCT/AT99/00198

(51) Int. Cl.[7] ................................................ F01L 1/34
(52) U.S. Cl. ................................. 123/90.16; 123/90.15; 123/90.6; 74/569
(58) Field of Search ............................ 123/90.15, 90.16, 123/90.17, 90.18, 90.24, 90.25, 90.26, 90.31, 90.34, 90.6; 74/569

(56) References Cited

U.S. PATENT DOCUMENTS

| | | |
|---|---|---|
| 1,937,152 A | 11/1933 | Jünk |
| 2,858,818 A | 11/1958 | Bailey |
| 2,888,837 A | 6/1959 | Hellmann |
| 2,954,017 A * | 9/1960 | Forstner .................. 123/90.16 |
| 4,200,081 A * | 4/1980 | Meyer et al. ............ 123/198 F |
| 4,711,202 A | 12/1987 | Baker |
| 5,297,508 A * | 3/1994 | Clarke et al. ............ 123/90.17 |
| 5,505,168 A | 4/1996 | Nagai et al. |
| 5,931,130 A | 8/1999 | Lucarini |

FOREIGN PATENT DOCUMENTS

| | | |
|---|---|---|
| DE | 37 00 715 A1 | 7/1987 |
| DE | 37 05 128 A1 | 9/1988 |
| EP | 0 429 277 A1 | 5/1991 |
| FR | 2 817 908 A1 | 6/2002 |
| GB | 19.193 | 6/1914 |
| GB | 434247 | 8/1935 |
| GB | 741831 | 12/1955 |
| GB | 2066403 * | 8/1981 |
| WO | 01/12958 A1 | 2/2001 |
| WO | 01/12959 A1 | 2/2001 |
| WO | 03/014535 A1 | 2/2003 |

* cited by examiner

Primary Examiner—Thomas Denion
Assistant Examiner—Jaime Corrigan
(74) Attorney, Agent, or Firm—Laurence A. Greenberg; Werner H. Stemer; Ralph E. Locher

(57) ABSTRACT

The valve drive mechanism is particularly suitable for internal combustion engines of motor vehicles. The mechanism has at least one driven cam element and a valve control member which is moved (translationally or rotationally) by the cam element. The cam element is rotatingly mounted in a flexible surround element which is connected to the valve control member in a plane orthogonal to the axis of rotation of the cam element. The surround element can be reversably extended, such as elastically extended, to enable a variation in the resulting valve lift.

35 Claims, 15 Drawing Sheets

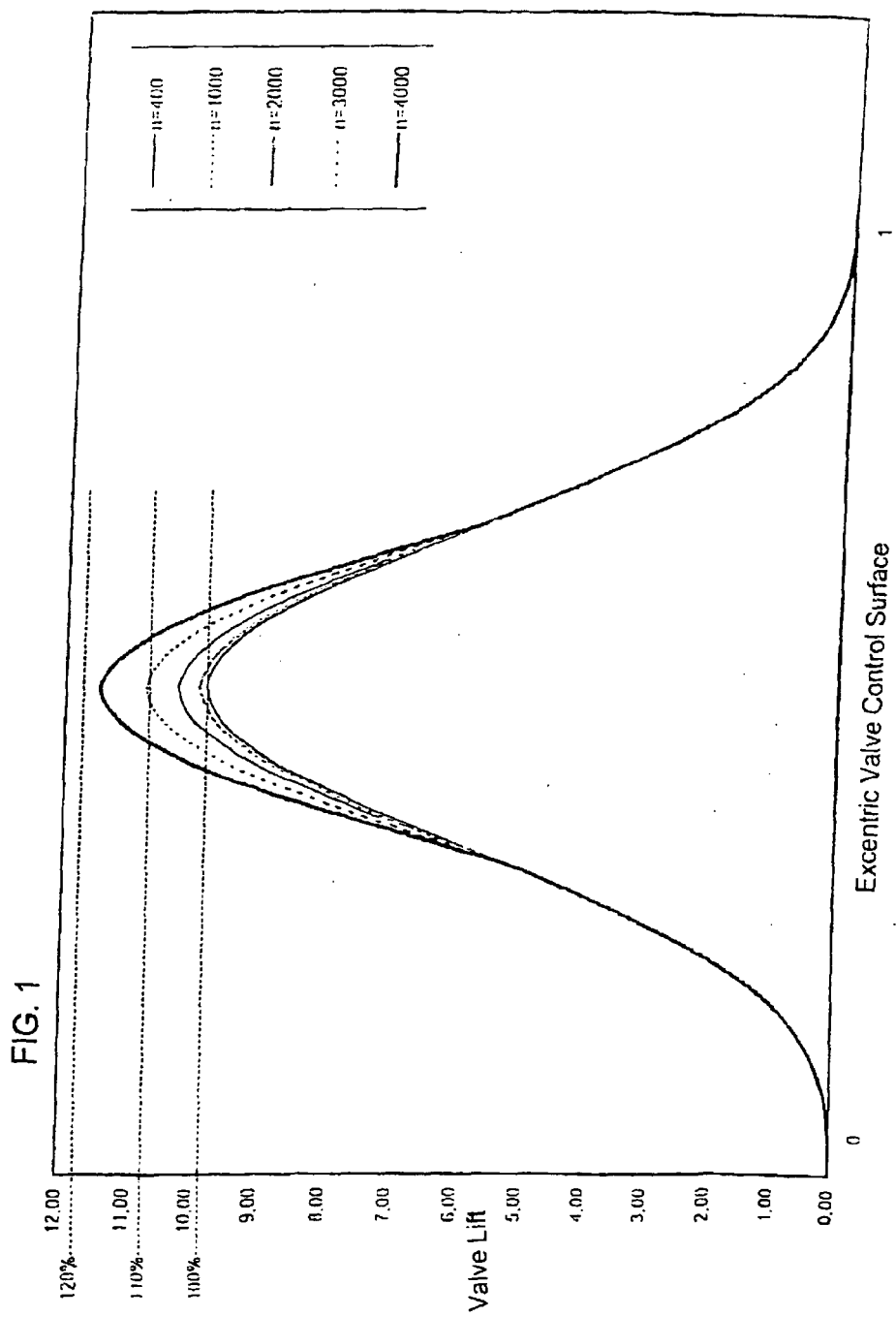

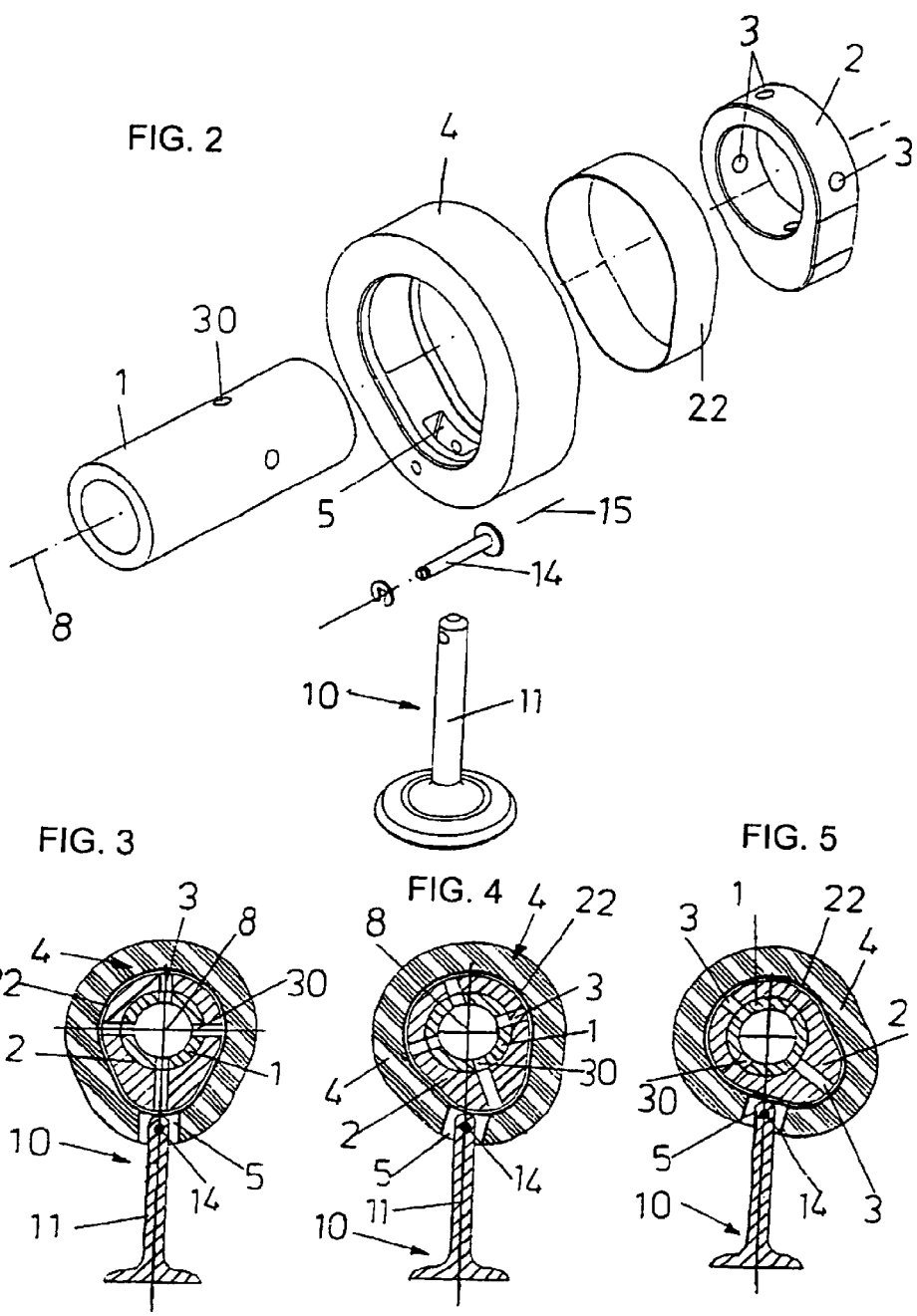

FIG. 6
FIG. 7
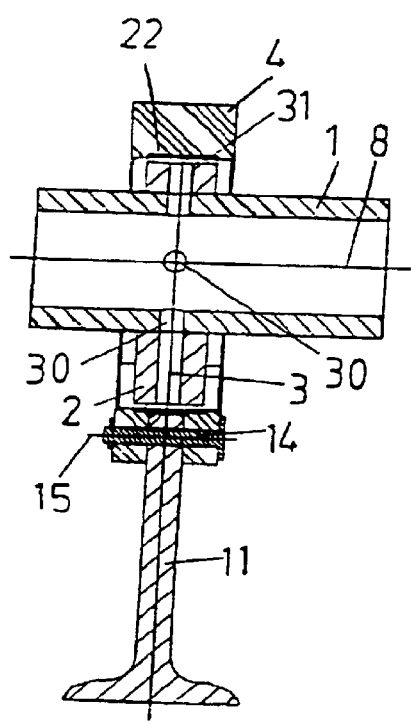
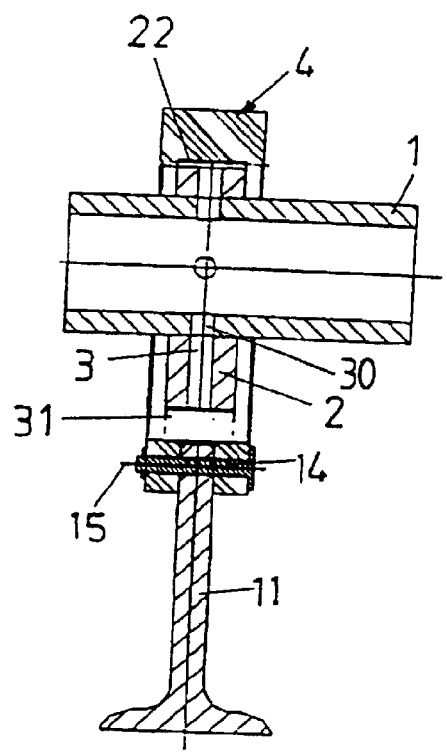

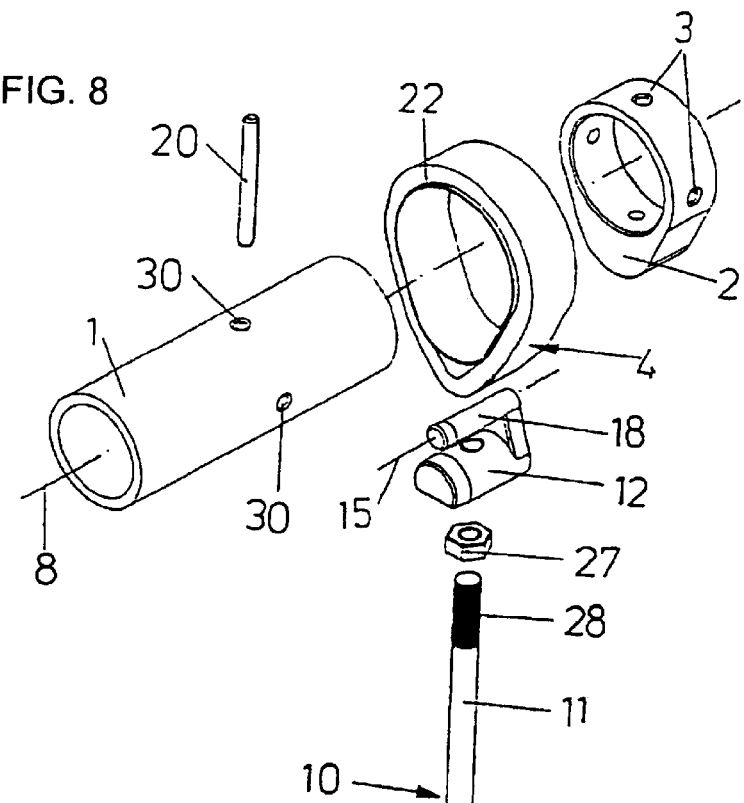
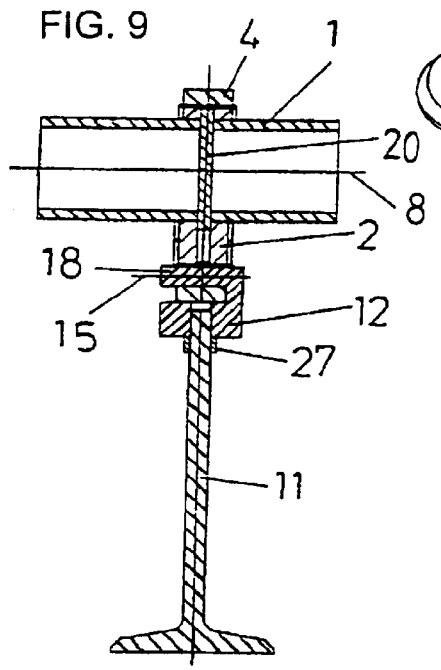
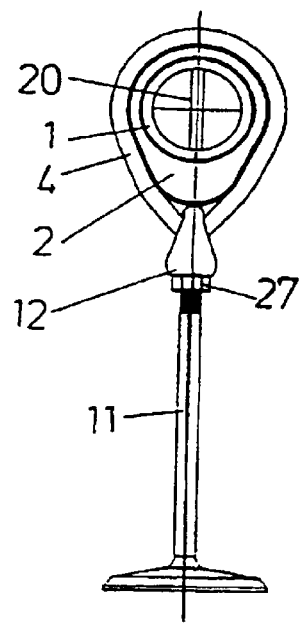

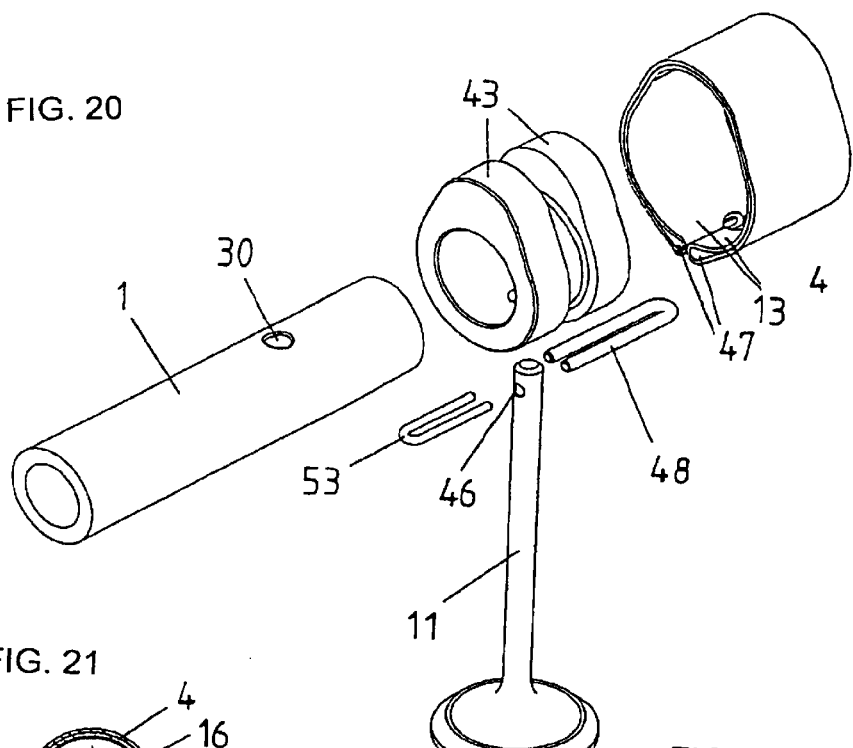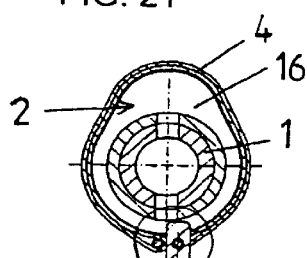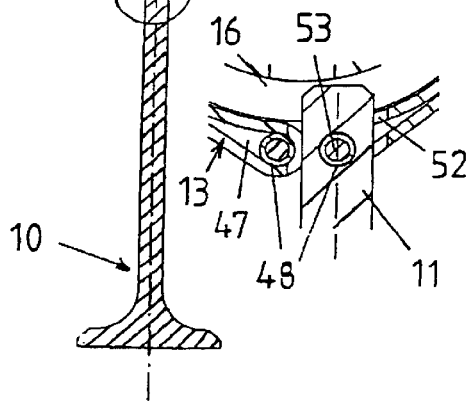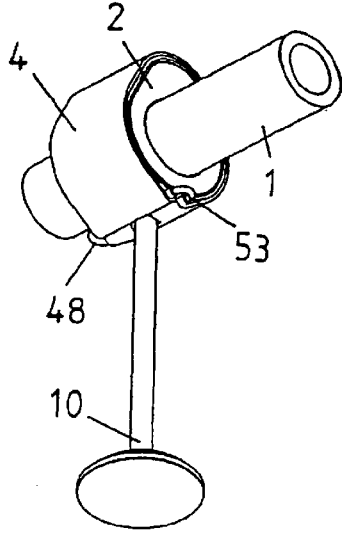

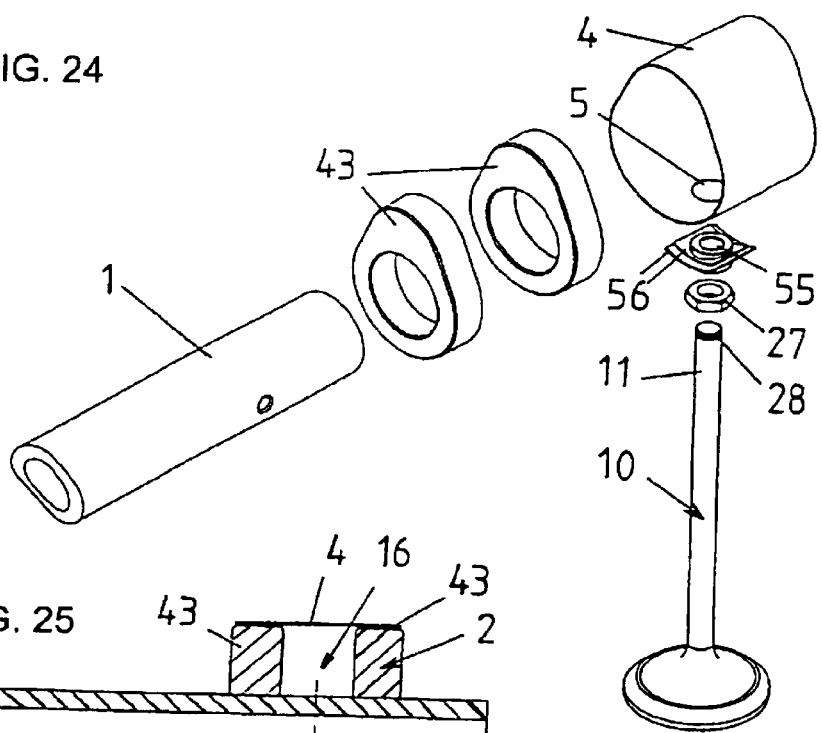
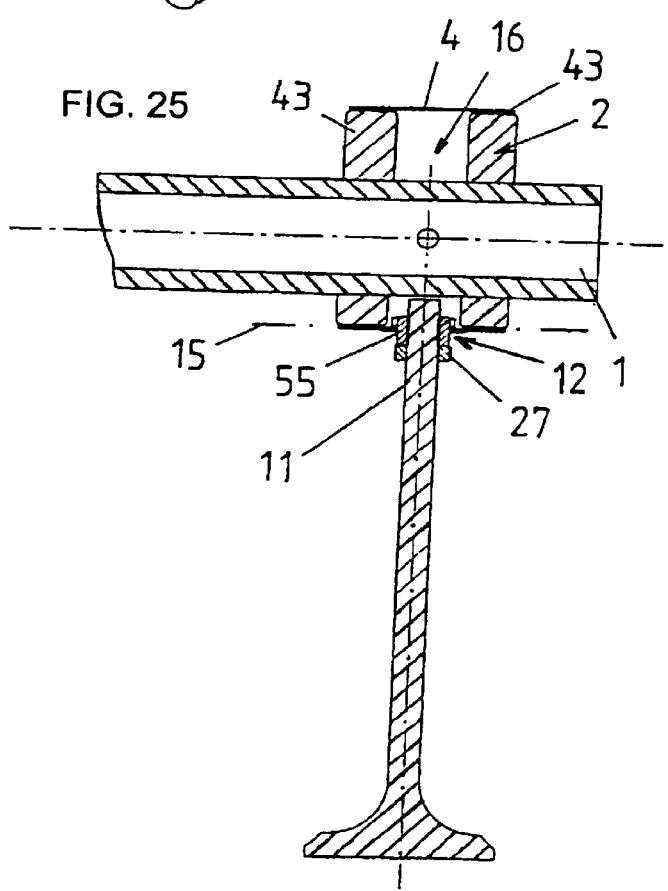

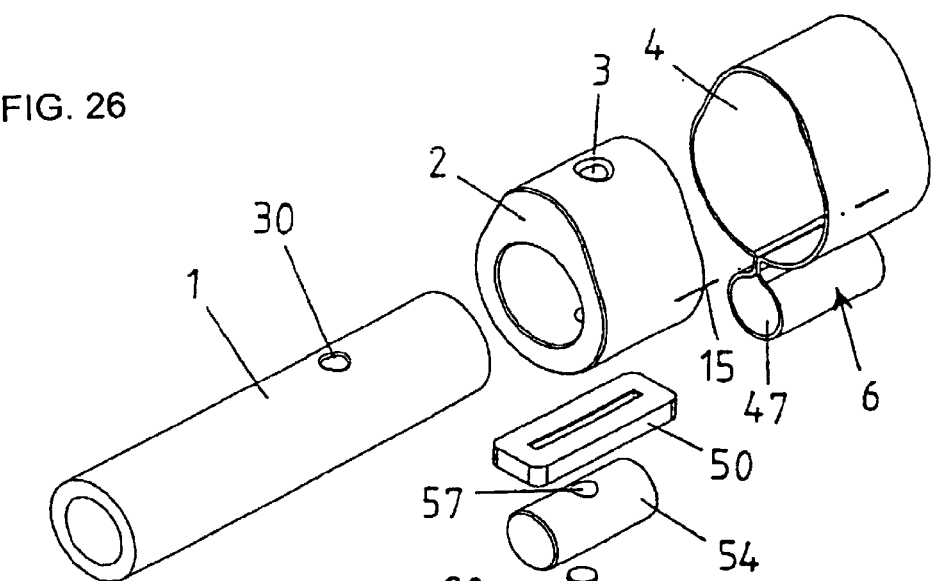
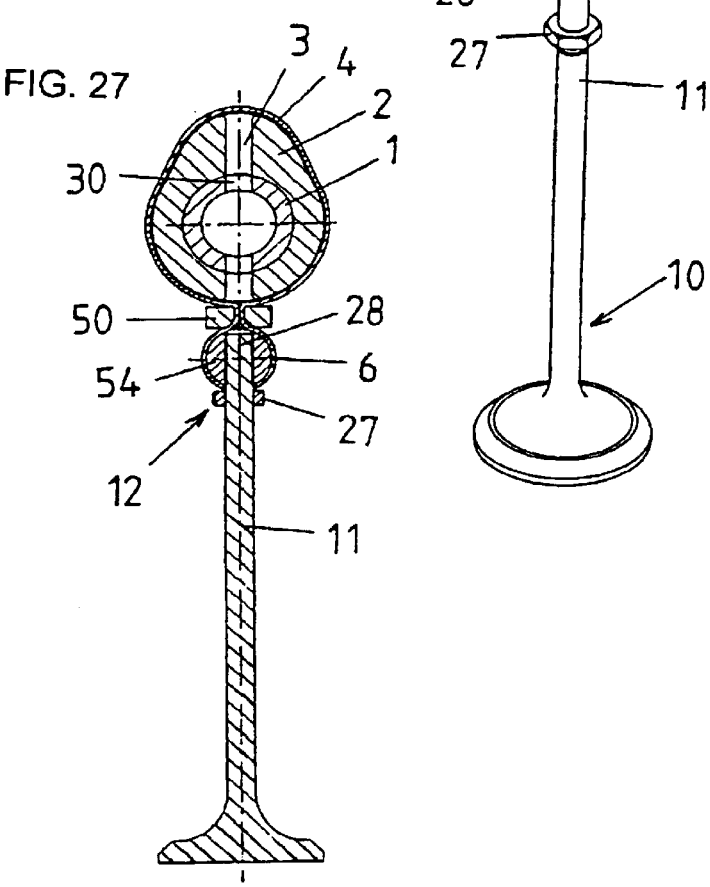
FIG. 26
FIG. 27

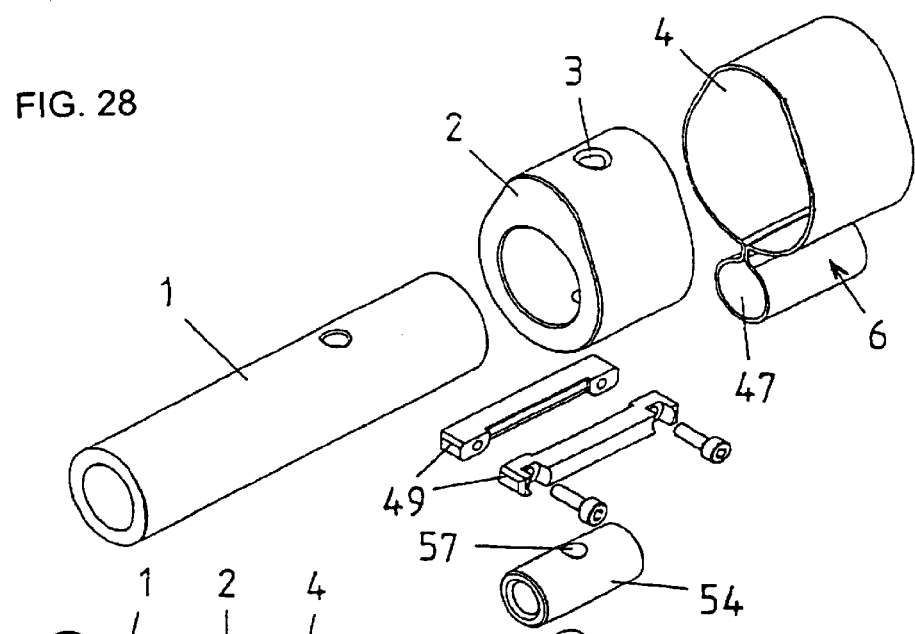
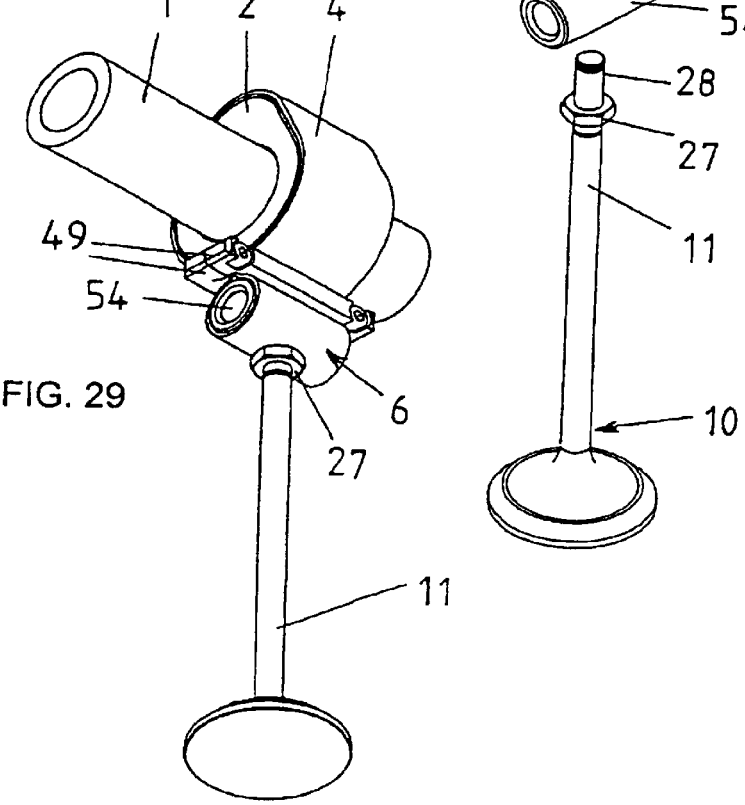
FIG. 28
FIG. 29

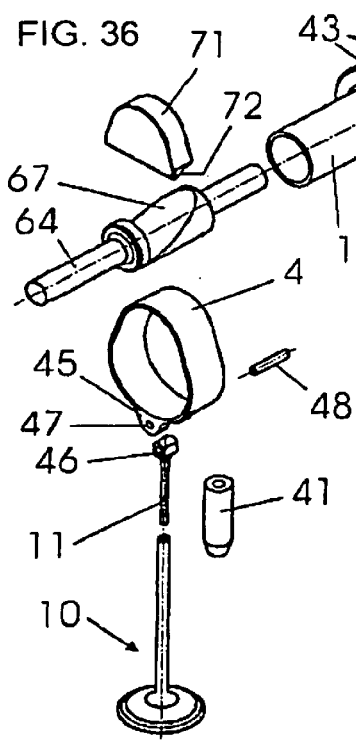
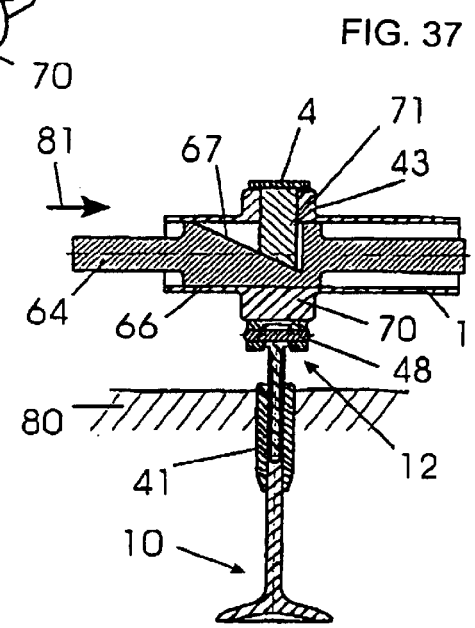
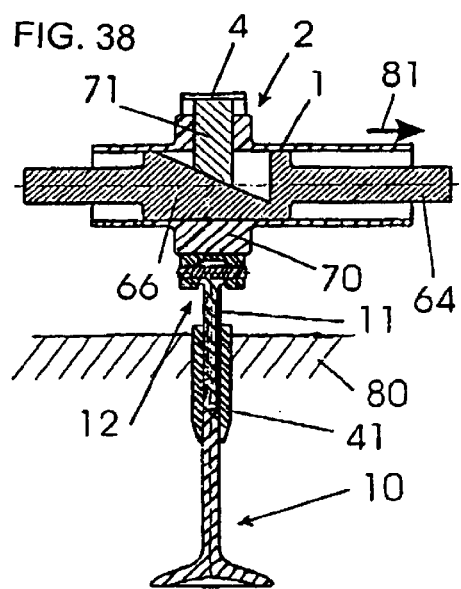
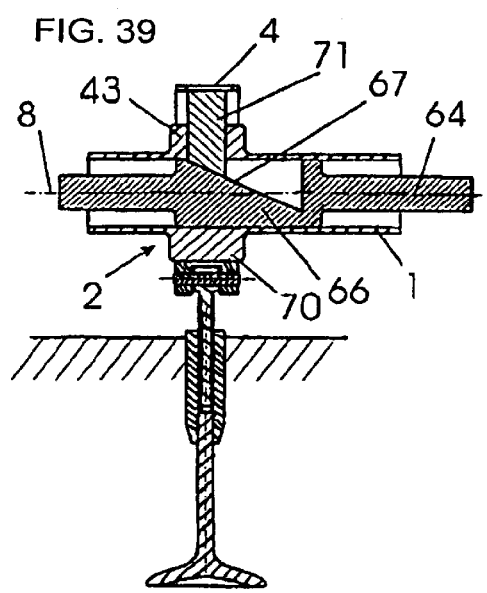

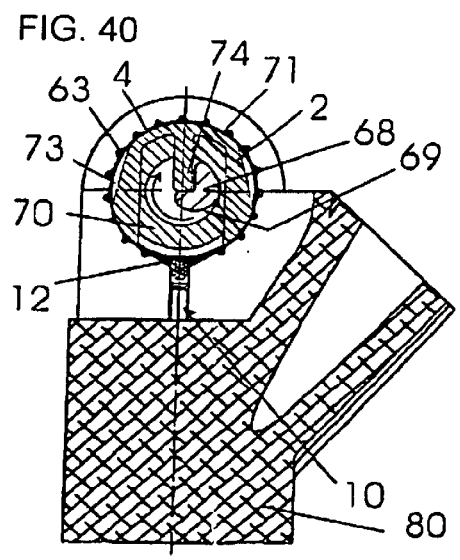
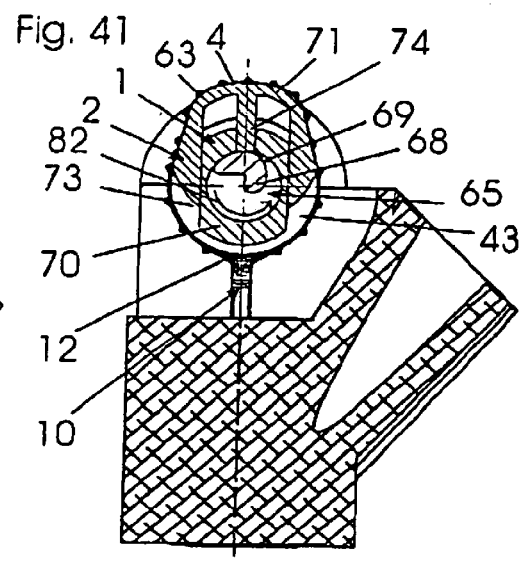
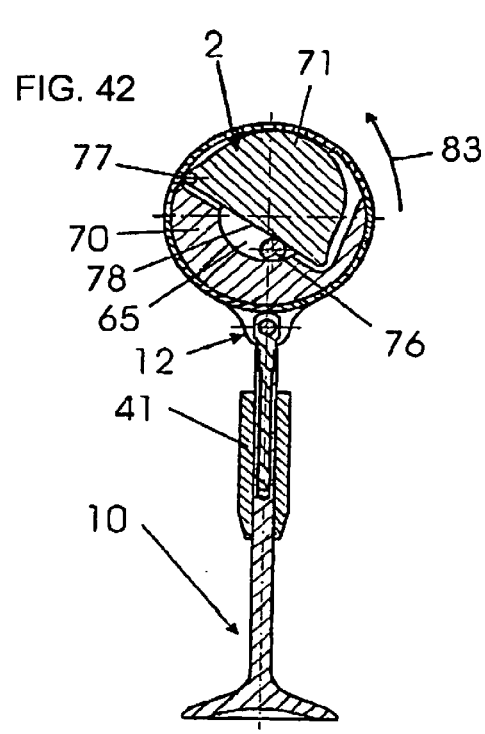
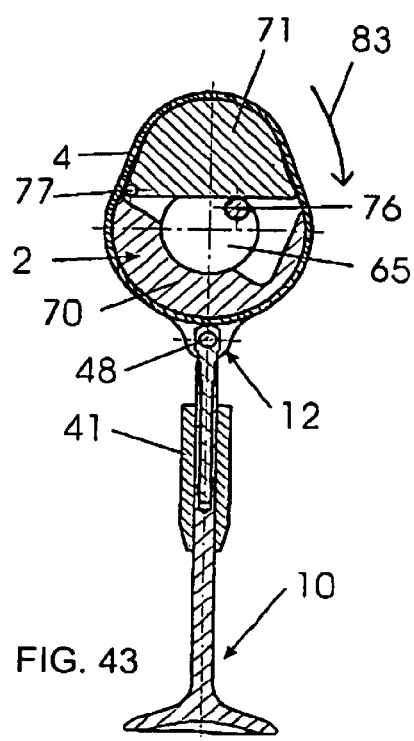

VALVE MECHANISM, IN PARTICULAR FOR INTERNAL COMBUSTION ENGINES

CROSS-REFERENCE TO RELATED APPLICATIONS

This application is a continuation-in-part of application Ser. No. 10/075,066, filed Feb. 12, 2002, now abandoned, which was a continuation of International Application No. PCT/AT00/00215, filed Aug. 8, 2000, which designated the United States and was not published in English.

BACKGROUND OF THE INVENTION

1. Field of the Invention

The invention relates to a valve mechanism, in particular for internal combustion engines of motor vehicles, having at least one driven cam element and having a valve actuator, which can be displaced or pivoted by the cam element, the cam element being arranged rotatably in a flexible surround element which is connected to the valve actuator in such a manner that it can move in a plane which is perpendicular to the axis of rotation of the cam element.

Valve mechanisms for controlling the valves of internal combustion engines, in particular for motor vehicles, usually have a device (spring, hydraulic element, etc.) which is used to load the valve toward its closed position. In this position, a valve actuator (valve lifter, drag lever, rocker lever or the like) is pressed against a continuous valve control surface, which in part runs eccentrically with respect to the shaft axis. When the valve is closing, it should be ensured that the valve disk does not strike the valve seat too quickly, since otherwise it will rebound. This requires relatively complex matching between the shape of the cam, the masses which are to be moved, the forces which are generated, the materials properties, etc.

Therefore, there is no lack of proposals concerning forced guidance of the valve actuator on the cam element; various embodiments have been developed, which are each based on two eccentric valve control surfaces instead of the restoring spring. Specific designs are to be found, for example, in British patent specifications GB 19,193(1913) and GB 434, 247, wherein the cam element, on at least one end face, has a groove, the two side walls of which form the valve control surfaces. A roller or the like which is arranged at the end of the valve actuator engages in the groove from the side. A cam element which has a web which can be gripped around is known, for example, from European publication EP 429 277 A.

A further proposal for a desmodromic valve mechanism, wherein a space-saving, lightweight and inexpensive design is achieved, is to be found in published German patent application DE 37 00 715 A which describes the generic type referred to in the introduction. In this design, a surround element is provided, which surrounds the circumference of the cam element without significant play, so that it always matches the shape of the cam, yet the cam element, on account of the nature of the surround element, can rotate inside the latter. Since the surround element connected to the valve actuator cannot rotate with the cam element, the movement of the cam region about the axis of rotation of the cam element is converted into a lifting or reciprocating movement of the valve actuator which is mounted displaceably or pivotably in the cylinder head. The valve actuator does not execute a movement as long as the connecting region of the surround element together with the valve actuator rests against the base circle region of the rotating cam element, is then moved away from the axis of rotation of the cam element in the radial direction and finally is returned again, while the cam region of the cam element moves past the connecting region of the surround element and the valve actuator. The moveable connection of the surround element to the valve actuator allows the pivoting or tilting movement of the surround element in the cam region, so that the required freedom of movement of the valve actuator in its sliding or pivot bearing is preserved. In the first exemplary embodiment, the surround element is formed by two flexible rings, between which needle-shaped rolling bodies are provided in order to reduce the friction. A second embodiment provides a plastic strip having an inner ceramic slip layer.

Particularly when the valve mechanism is used in internal combustion engines, a surround element is subject to high loads, and it is necessary to rule out temperature- or fatigue-related plastic lengthening of the surround element. An irreversible increase in the size of the gap between the circumference of the cam element and the surround element affects in particular the valve-closing position.

Furthermore, the term variable valve control has revealed a wide range of different structures which can be used to change the opening and closing time and the lift of the valve, in order to improve the performance, the exhaust emissions, the torque, etc. of an internal combustion engine. Compared to the non-adjustable valve control with fixed values, the filling of a cylinder is improved if the valve is opened later and closed earlier at low rotational speeds and is opened earlier and closed later at higher rotational speeds. It is therefore possible, by means of a speed-dependent adjustment of the valve control, to optimize the exhaust emissions, the torque, the engine performance, etc. All the variable valve control arrangements which have been revealed to date change the position of the actuating surface of the valve actuator relative to the eccentric valve control surface through rotation, linear displacement or enlargement of the cam element. These adjustment mechanisms are relatively complex and, in some cases, also require considerable adjustment forces, since they have to operate counter to the restoring elements of the valves.

SUMMARY OF THE INVENTION

It is accordingly an object of the invention to provide a valve lifting mechanism, particularly for an internal-combustion engine, which overcomes the above-mentioned disadvantages of the heretofore-known devices and methods of this general type and which provides for a variable forced valve control.

With the foregoing and other objects in view there is provided, in accordance with the invention, a valve mechanism, comprising:

at least one driven cam element and a valve actuator driven by said cam element;

a flexible surround element, said cam element being rotatably disposed in said flexible surround element about an axis of rotation and said flexible surround element being movably connected to said valve actuator for movement in a plane perpendicular to said axis of rotation of said cam element, and wherein said surround element is configured to be reversibly lengthened for adjusting a valve lift of said valve actuator.

In other words, the objects of the invention are achieved, in a valve mechanism of the type described in the introduction, in that the surround element is designed so that it can be lengthened reversibly.

The cam element rotating in the surround element generates tensile forces, which rise as a function of rotational speed, at the connecting point to the valve actuator, so that the surround element, which bears against the circumference of the cam element virtually without play at idling speed, is lifted increasingly further away from the circumference as the rotational speed rises, thus adopting positions which correspond to cam elements with greater circumferential lengths. Since, in this way, the distance between the axis of rotation of the cam element and the connecting point between the surround element and the valve actuator increases, an additional valve lift which is dependent on rotational speed is produced.

In a first embodiment, the reversible lengthening of the surround element is achieved by elastic stretchability of at least a partial region of the surround element, so that the play which is formed between the cam circumference and the surround element is reduced further as the rotational speed falls. Moreover, it allows advantageous, slight prestressing of the surround element in the at-rest state, in order to ensure that the valve-closing position is reached outside the cam region despite any temperature-related changes in length.

The surround element may consist of an elastically stretchable material or may be composed of two materials with different properties, at least one of which can stretch elastically. By way of example, a non-stretch strip may be closed with respect to the surround element by an elastically stretchable intermediate piece, wherein case a holder for the valve actuator may be provided either in the nonstretch region or in the elastically stretchable region. If the holder is in the elastically stretchable region, it may itself also consist of an elastically stretchable material and, if appropriate, may also form the elastic region.

For internal combustion engines of motor vehicles, the elastically stretchable material is preferably designed for an additional valve lift of 10% to 30% of the valve lift at idling speed. In order, in a preferred embodiment, to ensure an upper limit value of the elastic stretching, which can be selected for a permissible maximum rotational speed or a rotational speed above which an additional valve lift is of subordinate importance, a stretch-limiting means can be assigned to the elastically stretchable material by arranging nonstretch filaments or fibers, the length of which corresponds to the length of the elastic material which has been stretched to the limit, in or parallel to the stretchable material.

In a second embodiment, the surround element has a protuberance which is formed by an elastically resilient constriction, the tensile forces acting on the holder of the valve actuator causing the elastically resilient constriction to widen. The reduction of the constriction lengthens the surround element, which in this embodiment may itself be of nonstretch design. The holder is preferably arranged in the protuberance, with the result that the two regions of the surround element, which, at idling speed, come into contact with one another between the cam element and the holder, move away from one another as the rotational speed increases and move closer to one another as the rotational speed falls.

In a further embodiment, it is provided that the surround element has a strip comprising a textile-bound sheet material, in particular comprising a woven fabric, the two ends of which are connected to a holder for the valve actuator. When the two ends of the strip penetrate through one another or project from the cam element in contact with one another, the flexibility of the material of the surround element means that a physical axis in the connection to the valve actuator may be unnecessary, since the two ends together can be bent to both sides to the required extent. For connection to the valve actuator, it is preferable for the two ends of the strip to have plug-in openings for a connecting element. The plug-in openings may be formed by winding round and—depending on the material used for the strip—sewing, adhesively bonding or welding the wrapped-around end, or the like. A particularly advantageous embodiment provides for the strip to comprise a continuous loop which is guided backward and forward about the cam element and the reversal points of which form the plug-in openings. The connecting element may also be of elastically resilient design and consist, for example, of spring steel.

If the surround element consists of two different materials, the textile-bound sheet material may have a nonstretch region, wherein it contains filaments of Kevlar®, glass, carbon or aramid fibers, or the like, substantially constant-length fibers, extending in the circumferential direction of the cam element.

A surround element which forms a continuous loop may consist in particular of a sheet material which is produced using a textile circular working technique (circular weaving, circular knitting, etc.) and is provided with a holder for the valve actuator.

The elastic stretching of the loop may be selected to be linear, progressive or degressive, for example by incorporating filaments with different stretching properties, which become active simultaneously or in succession.

Further possible options provide an elastically stretchable cord or an elastically stretchable ring made from plastic, which is preferably provided with a recess for a bearing pin of the valve actuator. The plastic ring may be fiber-reinforced and/or provided with a slip-reducing metal coating. As an alternative, it is also possible to use a flat belt, in particular a ribbed belt, between the transverse ribs of which there is space for the bearing pin of the valve actuator, which is fixed by an adhesively bonded cover strip or the like. The ribbed belt may also be fitted in such a way that the ribs are internal, which eliminates the need for additional fixing of the bearing pin.

Materials which are particularly suitable for a surround element which has at least elastically stretchable partial regions have a modulus of elasticity of between 1 and 4000 N/mm$^2$. Rubber-like materials have low moduli of elasticity and are preferably provided with a stretch-limiting means.

Materials such as plastics which have higher moduli of elasticity, in particular between 600 and 2000 N/mm$^2$, preferably between 800 and 1200 N/mm$^2$, do not generally require a stretch-limiting means, although it is, of course, possible to provide such means.

A simple possible option for the stretch-limiting means consists in assigning nonstretch filaments of Kevlar®, glass, aramid fibers or the like, which extend in the circumferential direction and are, for example, woven into a strip, to the surround element or the elastically stretchable region of the surround element. Specifically in this design, it would also be possible to use an elastomeric plastic, which is vulcanized to the strip, for the ring or flat belt.

For internal combustion engines wherein the cylinders have two intake or discharge valves which operate in parallel, the valve pairs may have different stretching levels, for example one stretch-limited valve under partial load and the other valve without stretch-limiting means or with stretch-limiting means at full load.

If the surround element consists of a material with a low-friction surface or a surface which has been provided with a low-friction coating, it may be that lubrication of the sliding surfaces, i.e. of the circumferential surface of the cam element and of the inner surface of the surround element which bears against it, will not be required. If lubrication is required or desirable, it is preferable for the cam element to have at least one oil bore which runs radially with respect to the axis of rotation and opens out on the circumference of the cam element, inside the flexible surround element. Since the surround element does not rotate, external supply of oil through the surround element via a flexible line is also conceivable.

Instead of a film of lubricating oil, it is also possible to build up an air cushion surrounding the cam element by means of compressed air. This may be advantageous in particular in the case of a surround element made from plastic or woven plastic fabric.

In the valve mechanism according to the invention, the masses which have to be accelerated are reduced by the elimination of the valve spring and spring disk and by a significantly lighter design of the valve lifter or rocker lever. The use of light metals, ceramics or plastics for the valve and/or the valve actuator allows the masses which have to be accelerated and decelerated to be reduced by from 50% to 80% of the value for a valve lifter with restoring spring and hydraulic play compensation. The high values result in particular in the part-load range, since the valve springs have to be designed to be able to withstand full load. Furthermore, the valve may be of shorter design, since the bulky valve spring is eliminated.

It is also possible for the cam element to be of shorter design. It also becomes possible to form plastic cam elements or camshafts which are produced completely from plastic, for example by injection molding. The use of other lightweight materials for the production of the camshafts or of the cam elements, for example aluminum, also becomes possible. On account of the reduction in mass and the lubrication, fuel savings of 5% and more are to be expected.

Particularly if valve actuators are actuated together, it is possible to provide a weak spring for acting on each closed valve.

According to another feature of the invention, the cam element has a circumference variably adjustable in correspondence with a length of the surround element.

According to yet another feature of the invention, the cam element has a cam circumference surface with a cylindrical region and an eccentric region; the cam element has a first cam part and a second cam part, the first and second cam parts are movable relative to one another; and the first cam part includes the cylindrical region of the cam circumference surface, the second cam part includes the eccentric region of the cam circumference surface.

According to a further feature of the invention, a camshaft has an inclined camshaft surface, the camshaft is movable along the longitudinal direction in a support shaft; the second cam part is guided in the first cam part and can be pushed radially outwardly; and the second cam part has an inclined surface cooperating with the inclined camshaft surface.

According to another feature of the invention, a camshaft has a spiral-shaped control surface, the camshaft being rotatable in a support shaft; the second cam part is guided in the first cam part and can be pushed radially outwardly; and the second cam part has a bridge cooperating with the spiral-shaped control surface of the camshaft.

According to yet another feature of the invention, a support shaft defines an axis of rotation; a camshaft has a crankpin and is rotatable in the support shaft; and the second cam part is disposed at the first cam part and is pivotable about an axis parallel to the axis of rotation, the second cam part has a guide surface cooperating with the crankpin.

In the previously described exemplary embodiments the lengthening of the surround element takes place exclusively by the tensile forces which increase in dependence on the rotational speed at the junction with the valve actuator, such that it lifts off from the cam element.

This lifting off which may be disadvantageous with regard to an uninterrupted lubricating film is eliminated when the circumference of the cam element is lengthened to the same extent. A lengthening of the circumference can be achieved in particular in that the cam element is constructed as having at least two parts and in that a part which carries the eccentric valve control surface can actively be adjusted with respect to a distance to the axis of rotation of the cam element for example in that the part which carries the eccentric valve control surface can be radially pushed inward or outward or can be pivoted inward or outward about an axis which is parallel to the axis of rotation of the cam element. Operating mechanisms for adjusting a part which carries the eccentric valve control surface are known from variable valve controls (U.S. Pat. Nos. 2,888,837 and 3,489,032).

In a first embodiment of the invention, the operating mechanism includes a longitudinally adjustable camshaft with an inclined surface which cooperates with a corresponding inclined surface at the adjustable part of the cam element. In a further embodiment, the control shaft can be rotated relative to the support shaft and can include a crankpin-like element which moves the adjustable part out or in. If the part is pivoted, an asymmetrical adjustment of the cam profile takes place which additionally results in different valve opening and closing characteristics. The active adjustment of the valve lift allows an increased adjustment range due to the fact that a no-stroke or "zero lift" can be chosen as a basis, wherein the parts of the cam element fit into each other within a circular peripheral outline. The no-stroke, for example, is important if it should be possible to turn off individual cylinders in a combustion engine.

Other features which are considered as characteristic for the invention are set forth in the appended claims.

Although the invention is illustrated and described herein as embodied in a valve mechanism, in particular for internal combustion engines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows a graph illustrating a speed-dependent change in length of the surround element;

FIG. 2 shows components of a first embodiment of a forcibly controlled variable valve mechanism in perspective;

FIGS. 3 to 5 show cross-sectional illustrations of various angular positions of the first embodiment of the valve mechanism;

FIGS. 6 and 7 show longitudinal sections through the first embodiment, FIG. 6 illustrating the valve actuator at idling speed and FIG. 7 illustrating the valve actuator at a higher speed;

FIG. 8 shows components of a second design of a valve mechanism, in a perspective view, FIG. 9 shows a longitudinal section through the third embodiment; and FIG. 10 shows a side view of the third embodiment, in each case at idling speed;

FIG. 20 shows a perspective view of components of a seventh embodiment;

FIG. 21 shows a cross section through the seventh embodiment;

FIG. 22 shows an enlarged detailed view of part of FIG. 21;

FIG. 23 shows a perspective view of the seventh embodiment;

FIG. 24 shows a perspective view of components of an eighth embodiment;

FIG. 25 shows a longitudinal section through the eighth embodiment;

FIG. 26 shows a perspective view of components of a ninth embodiment;

FIG. 27 shows a cross section through the ninth embodiment;

FIG. 28 shows a perspective view of components of a tenth embodiment;

FIG. 29 shows a perspective view of the tenth embodiment;

FIG. 36 shows a perspective view of parts of a thirteenth embodiment;

FIGS. 37 to 39 show longitudinal sections through the thirteenth embodiment, wherein FIG. 37 shows a no-stroke position, FIG. 38 shows a normal stroke position, and FIG. 39 shows an auxiliary lift position;

FIGS. 40 and 41 show a no-stroke and an auxiliary lift position of a fourteenth embodiment; and FIGS. 42 and 43 show a no-stroke and an auxiliary lift position of a fifteenth embodiment.

DESCRIPTION OF THE PREFERRED EMBODIMENTS

Figure 11:
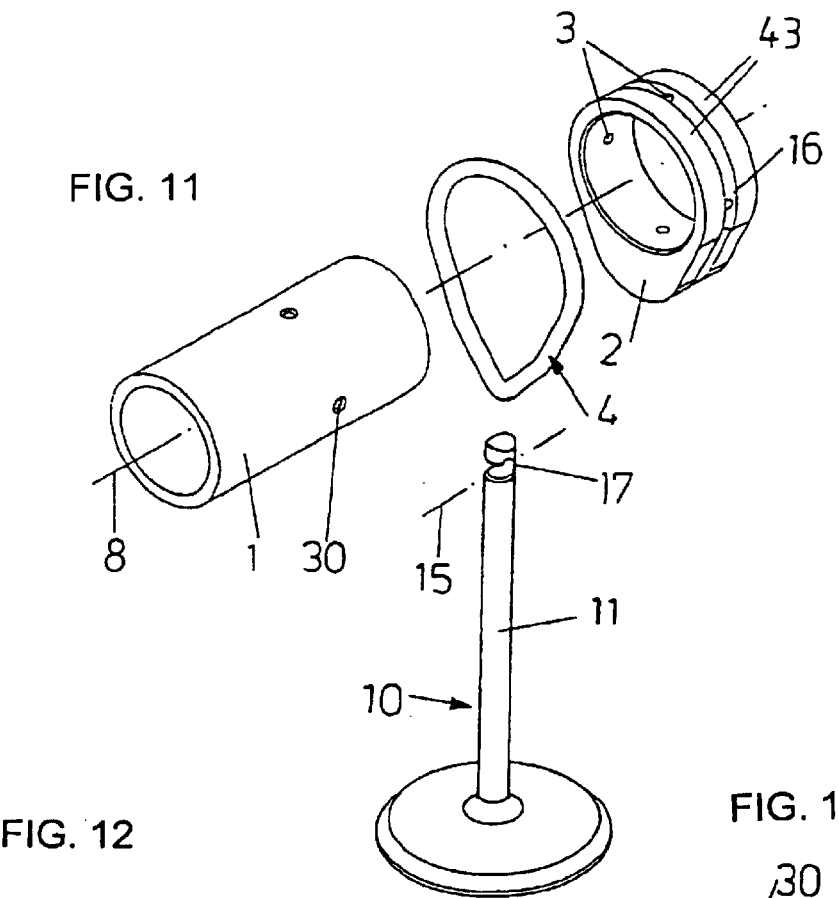
FIG. 11 shows components of a fourth embodiment of a valve mechanism, in a perspective view.

The drawings in each case show a forcibly guided valve mechanism, wherein a valve mechanism used for an internal combustion engine of a motor vehicle has, on the support shaft 1, the number of cam elements 2 which are required for the valves. A supply of oil in order to build up a film of oil or of air in order to build up an air cushion on the circumferential surface of the cam element 2 can be effected via a hollow support shaft, radial openings 30 in the support shaft 1 and via bores 3 in the cam element 2. An arrangement of openings 30 and bores 3 can also, as shown in FIGS. 8 to 10, be used to secure the cam element 2 on the support shaft 1 when a fixing pin 20 is inserted. The valve lift, the increase wherein as a function of the rotational speed is illustrated in the diagram shown in FIG. 1, can be seen from a comparison of FIGS. 3 to 5. The diagram shown in FIG. 1 illustrates the change in length of the surround element 4; the eccentric range 0 to 1 of the cam element 2, starting and ending at the base circle region (not shown), wherein the valve-closing position is produced, is plotted on the abscissa. Depending on the selected conditions, the eccentric range extends over an angle of approximately one third to two thirds of the circumference of the cam element 4, for example over an angle of approximately 150°, as shown in the figures. At a rotational speed of the camshaft of 400 revolutions per minute, which corresponds to the engine idling, the diagram shows a valve lift of 9.7 mm, denoted as 100%. If the rotational speed increases, the lift should become greater, for example reaching an additional valve lift of 1.75 mm at a maximum of 4000 revolutions per minute, corresponding to an increase of approximately 18% in valve lift. The speeds indicated, in this figure and below, always refer to the rotational speeds of the camshaft itself, which in the case of internal combustion engines for motor vehicles are generally half as great as the engine speeds, i.e. in the example indicated the idling speed of the engine is 800 and the maximum speed 8000 revolutions per minute.

In order, despite forced control, to increase the valve lift as a function of the rotational speed, the cam element 2 is surrounded by a surround element 4, which can be reversibly lengthened and substantially bears against the circumferential surface, it being possible for the cam element 2 to rotate in the surround element 4, about its axis of rotation 8, with continuous pulsed deformation of the surround element 4. In the figures, the cross-sectional shape of the surround element 4 is in each case illustrated matched to the cam element 2, since in these figures the valve mechanism is shown in an exploded view. As an individual element, the surround element 4 is only in the form of a ring if the material is sufficiently elastic and thick, while otherwise it forms a collapsed oval or the like. The surround element 4 is prevented from rotating by the connection to a valve actuator 10, which in the case of the valve lifter is mounted in such a manner that it can be moved in translation in a sliding-contact bearing, while in the case of a rocker or drag lever is mounted so that it can be pivoted in a pivot bearing. This also permits an embodiment wherein a lubricant is supplied through the stationary surround element 4. The surround element 4 is connected to the valve actuator 10 in such a manner that it can tilt or pivot about an axis 15, so that, when the cam of the cam element 2 passes through the connecting region of the valve actuator 10, it is possible for the surround element 4 to pivot relative to the valve actuator 10. This is necessary since, as illustrated in FIGS. 3 to 5, the sliding-contact bearing of the valve stem 11 does not allow any lateral deflection, and the valve stem 11 has to be directed radially toward the axis of rotation 8.

The higher the rotational speed of the cam element 2, the greater the tensile forces which are produced in the surround element 4, these forces, on account of the fact that the surround element 4 can be lengthened reversibly, leading to the distance between the axis of rotation 8 and the axis 15, at which a valve actuator 10 is articulatedly mounted, increasing. This increase in distance produces an additional valve lift.

In the first embodiment, shown in FIGS. 2 to 7, the surround element 4 is formed by a ring made from a flexible, elastically stretchable and, if appropriate, fiber-reinforced plastic, which has only a low resistance to deformation. At one point, the ring contains a window 5, wherein a bearing pin 14, which runs parallel to the axis of rotation 8 of the cam element 2 and lies in the axis 15, passes through the valve stem 11. On the inner surface of the ring, which surrounds the cam element 2, there is a continuous thin loop of a friction-reducing strip 22, wherein the cam element 2 rotates. The strip 22 may likewise be elastically stretchable and may consist, for example, of a low-friction plastic, a woven fabric or the like. As shown in FIG. 6, a small gap 31 remains between the strip 22 and the circumferential surface of the cam element 2, generally if only for assembly reasons, wherein gap a film of oil can be formed for lubrication purposes. As the rotational speed rises, the elastic stretching of the surround element 4 means that the gap 31 increases in size, as can be seen from a comparison between FIGS. 6 and 7, so that the valve lift is increased.

FIGS. 8 to 10 show an embodiment wherein a holder 12 is formed in the shape of an "iron", the bearing pin 18, in a similar manner to that shown in FIG. 2, being arranged between the elastically stretchable strip 22 and the ring 4 made from elastically stretchable plastic or the like and forming the axis 15. The end section of the bearing pin 18 widens slightly, in order to prevent axial slipping in the surround element 4, the opposite region of the holding body 12 being beveled, in order for it to be possible to push the holding body 12 in laterally. The holding body 12 has a threaded bore, into which the valve stem 11, which has a screw thread 28, can be screwed and fixed adjustably by a locking nut 27. As has been mentioned, FIGS. 8 to 10 also show a possible way of fixing the cam element 2 on the support shaft 1 by means of a pin 20, which is fitted through bores 30 in the shaft 1 and bores 3 in the cam element 2.

Figure 12:
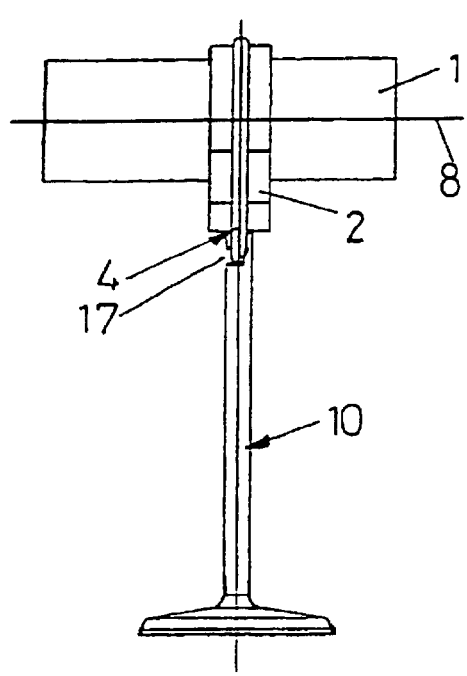
FIG. 12 shows a side view of the fourth embodiment.
Figure 13:
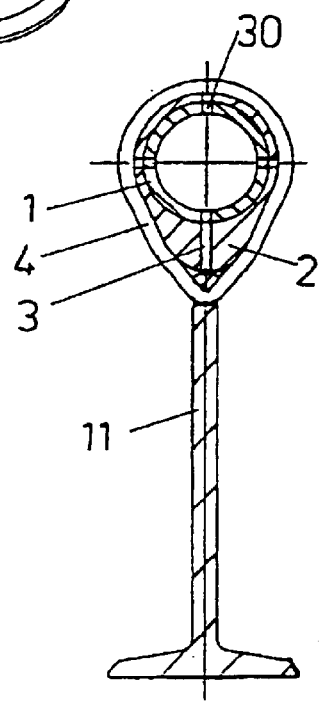
FIG. 13 shows a cross section through the fourth embodiment, in each case at idling speed.

FIGS. 11 to 13 show an embodiment wherein the surround element 4 is formed by a continuous loop of an elastically stretchable cord, which is arranged slideably in a groove 16 in the circumferential surface of the cam element 2. The cam element 2 is divided into two cam regions 43 which are spaced apart from one another in the axial direction, the groove 16, wherein the oil bores 3 of the cam element 2 open out, forming the central region. The valve stem 11 of the valve actuator 10 is provided with an, in particular laterally open, hook-like eyelet 17, wherein the cord loop is suspended, and is rounded on the top side parallel to the axis 15, in order to allow the pivoting, as can be seen in particular from FIG. 13. The eyelet 17 may also be of closed design, if a piece of a cord is only closed up to form the cord loop after it has been threaded into the eyelet 17. In this embodiment, the surround element 4 is slightly larger than the cam circumference, since it is also guided through the eyelet 17. The elastic stretchability also compensates for the changes in the surround length which result from rotation of the cam element on account of the eyelet 17 holding the cord at a distance from the circumference.

Figure 14:
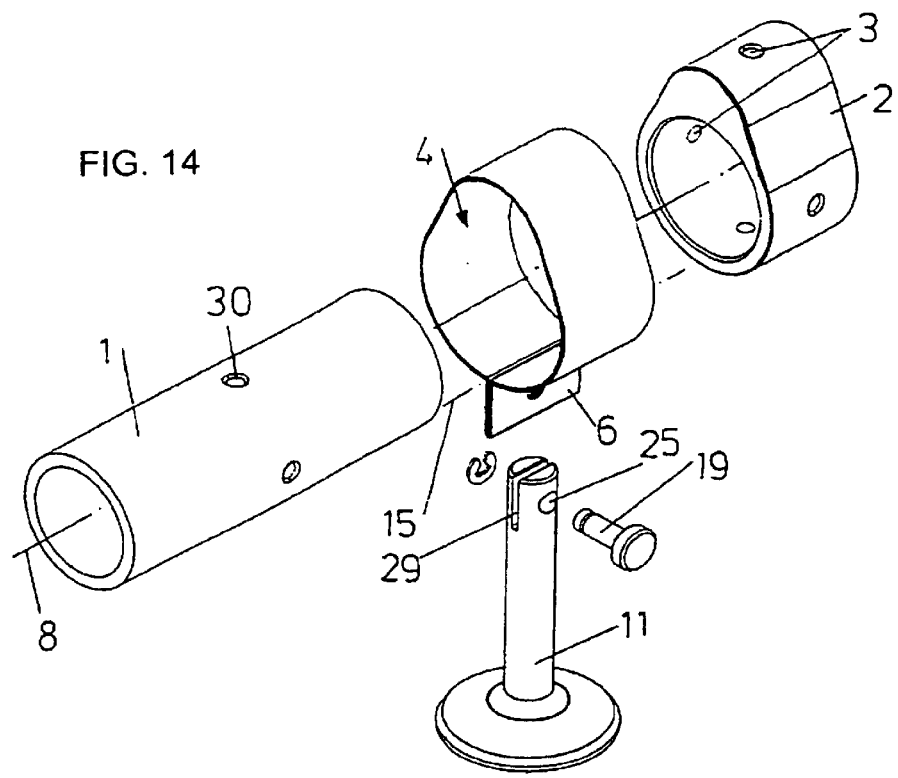
FIG. 14 shows a perspective view of components of a fifth embodiment.
Figure 15:
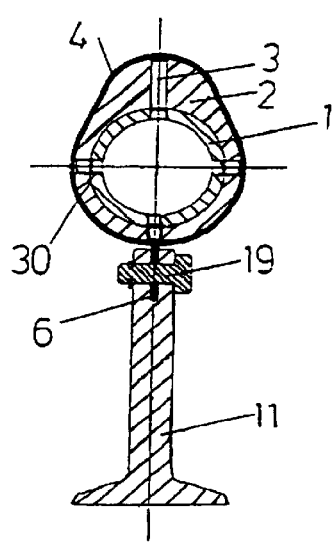
FIGS. 15 and 16 show cross sections through the fifth embodiment, FIG. 15 showing the valve actuator at idling speed and FIG. 16 showing the valve actuator at a higher speed.
Figure 16:
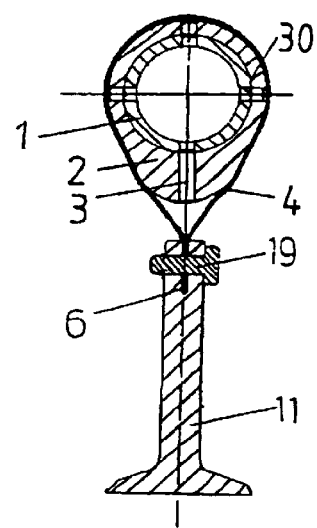

FIGS. 14 to 16 show an embodiment wherein the surround element 4 is formed from a strip of elastically stretchable sheet structure with textile binding, in particular a woven fabric or the like. For connection to the valve actuator 10, a protuberance 6 is formed on the surround element 4, which protuberance can be fitted into a slot 29 in the valve stem 11. Connection is effected by means of a cotter pin 19, which passes through the bores 25 in the valve stem 11 and the protuberance 6. The surround element 4 may be a single, continuous loop or turn with a protuberance 6 which has been pressed flat. The single loop or turn may also be formed by bringing together both ends 13 of a strip, which when in contact with one another form the protuberance 6 and together are inserted into the slot 29. In this embodiment, the axis 15 is not physically embodied, but rather results from the bending region between the protuberance 6 and that part of the surround element 4 which surrounds the circumferential surface of the cam element 2. FIG. 15 shows the position of the valve stem 11 in the closed position, and FIG. 16 shows a position at a high rotational speed, wherein the two ends 13 of the strip have been moved away from one another between the upper end of the valve stem 11 and the cam element.

Figure 17:
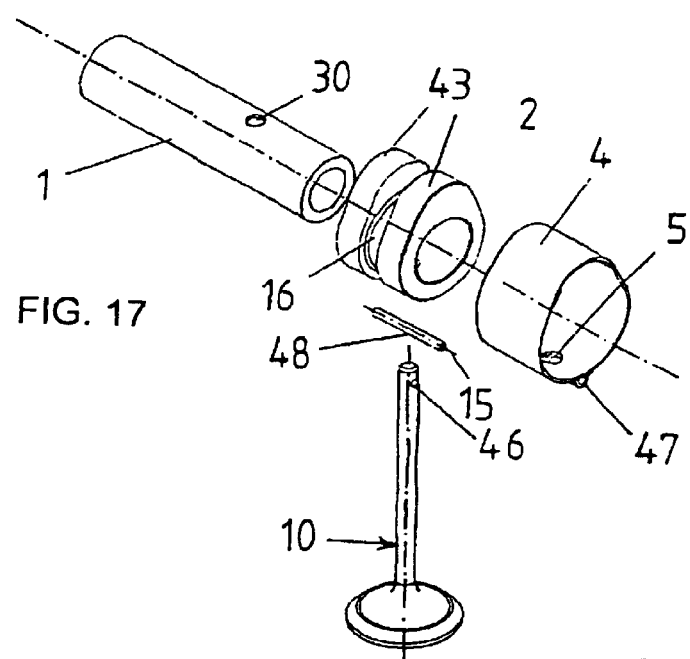
FIG. 17 shows a perspective view of components of a sixth embodiment.
Figure 18:
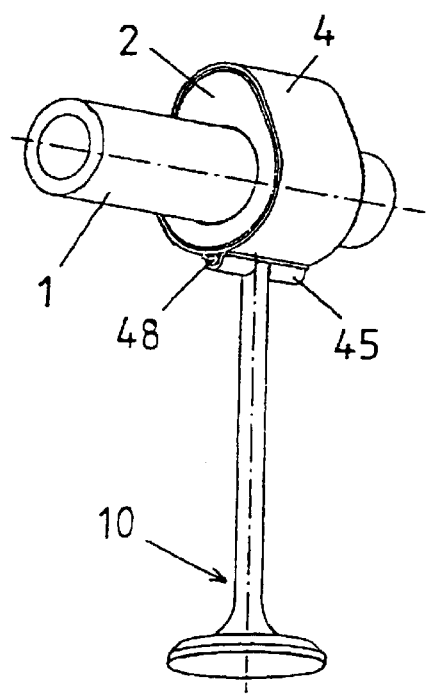
FIG. 18 shows a perspective view of the sixth embodiment in the closed position.
Figure 19:
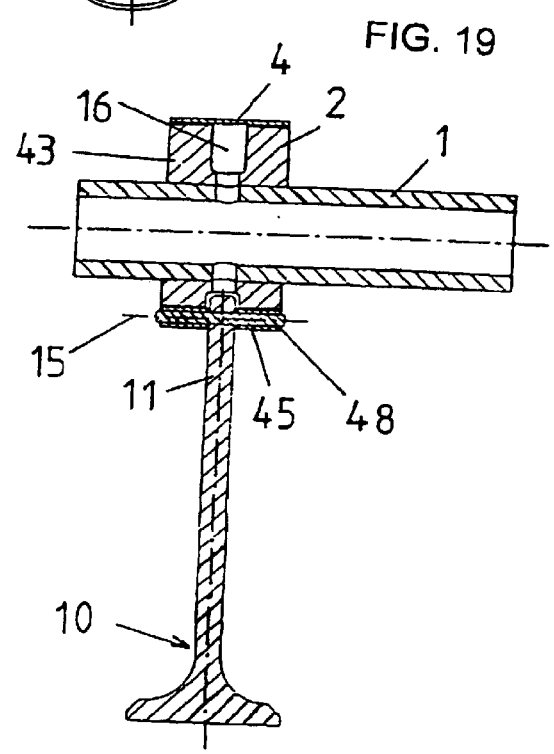
FIG. 19 shows a longitudinal section through the sixth embodiment.

In the embodiment shown in FIGS. 17 to 19, the cam element 2 is provided with a circumferential groove 16, the base of which is concentric with respect to the support shaft 1. In this way, the cam element 2 is divided into two cam regions 43, which are connected by means of a material-saving central region. The surround element 4, which in this embodiment is formed by a continuous loop of an elastically stretchable strip, has at one point an adhesively bonded or sewn tab 45 which defines a plug-in opening 47. In the central region the loop and the tab 45 are provided with a window 5. In the securing region, the valve actuator 10 has a bore 46, so that, after insertion into the window 5, a connecting element 48, in the form of a pin or cotter pin, can be pushed through the plug-in opening 47 and the bore 46. The pin in turn forms the axis 15, which extends parallel to the support shaft 1. The free end of the valve stem 11 in this case projects into the circumferential groove 16, resulting in axial guidance also being provided. The seamless woven strip of the surround element 4, which is preferably produced using a textile circular working technique (circular weaving, circular knitting or the like) contains carbon, Kevlar® or aramid filaments or fibers or the like to protect against excessive stretching, since this produces a highly constant length and a good thermal stability. The nonstretch filaments have a length which corresponds to the maximum circumferential length and may be the weft filaments, running in the circumferential direction, of the woven-fabric ring or additional filaments which, for example, in the unstretched state are connected to the woven-fabric ring in waves or zigzag form. The woven fabric may also be provided with a low-friction coating.

FIGS. 20 to 23 show a similar design, wherein, once again, a circular-worked, in particular circular-woven strip is used to produce the surround element 4. The strip circumference substantially corresponds to twice the circumference of the cam element 2 and is brought together so as to form a double-layer open loop. The reversal points of the strip at the ends 13 of the open loop form the plug-in openings 47 for the hollow connecting element 48, which in this embodiment is bent into a U shape. Both ends 13 are cut out in the central region 52, and the two cutouts complement one another to form the window 5 through which the end of the valve stem 11 projects into the circumferential groove 16 of the cam element. As a result, the installation position of the valve actuator 11 can lie laterally offset, parallel to the axial plane, as can be seen from FIG. 21, which may result in advantages with regard to a change in the rolling and contact lines. Of course, the valve stem 11 may also lie in the axial plane, so that the two plug-in openings 47 are not symmetrical. A second part 53 which is bent into a U shape is inserted into the hollow connecting element 48 and is, for example, adhesively bonded, so that the connection between the surround element 4 and the valve actuator 10 is ensured.

Instead of using the U-shaped connecting element 48, the two ends 13 of the open loop could also be connected by an element which is similar to a belt buckle and has one or two slots through which the ends 13 are guided and are fixed by pins inserted into their plug-in openings 47. The belt-buckle-like element forms the holder 12 for the valve actuator, into which it is screwed or latched.

An elastically stretchable connection of the two ends 13 can also be achieved by connecting the protruding ends of pins which have been inserted into the plug-in openings 47 by two tension springs made from steel.

In the embodiment shown in FIGS. 24 and 25, a sleeve 55, which is provided with a pair of connecting tabs 56 and projects inward into the circumferential groove 16, is inserted into the window 5 in the surround element 4, which is formed by a continuous loop of a woven strip or the like. The connecting tabs 56 are-adhesively bonded or welded or joined in some other way to the surrounding area of the window 5. At the free end, the valve stem 11 has a screw thread 28, and the stem can be screwed into a screw thread in the sleeve 55 to an adjustable depth and can be clamped by means of a mating nut 27. In this embodiment, the cam element 2 comprises two cam regions 43, which are not connected to one another, but rather are fixed separately on the support shaft. Instead of the screw connection, it would also be possible to form a latching or snap-action connection between the sleeve 55 and the valve stem 11, so that rotation about the axis of the valve stem 11 is possible. The axis 15 about which the surround element 4 has to be pivoted backward and forward to a limited extent with respect to the valve actuator 10 runs between the connecting tabs 56, on account of the flexibility of the material used.

In the embodiments shown in FIGS. 26 to 32, the surround element 4 is in each case designed as a continuous loop with a protuberance 6, which is divided from the cam element by a constriction which is, for example, adhesively bonded, sewn or clamped, and accommodates an insert 54 which serves as holder 12 of the valve actuator 10. Particularly in these embodiments, the surround element may also be of constant-length design, if the constriction between the holder 12 and the cam element 2 is of elastically resilient design. In this way it is possible, for example, to sew the constriction by means of rubber filaments or the like.

FIGS. 26 and 27 show an embodiment wherein the constriction of the surround element 4 is effected by an elastically widenable eyelet 50, through which the protuberance 6, which has been pressed flat, is threaded. The insert 54 which has been pushed into the protuberance 6 has a latching or threaded bore 57, into which the latchable or threaded end 28 of the valve stem 11 can be pushed or screwed. In the latter case, a mating nut 27 is used for adjusting and fixing the length of the valve actuator 10. The tensile forces, which rise at higher rotational speeds, widen the eyelet, so that the regions which are in contact with one another in the constriction move away from one another, and the constriction is stretched.

FIGS. 28 and 29 show a similar connection between the surround element 4 and the valve actuator 10, wherein the constriction of the protuberance 6 is effected by two clamping jaws 49 which are clamped to one another, in particular resiliently. The two clamping jaws 49 may also be of identical design, so that in each case one connecting screw is inserted into a clamping jaw 49. If appropriate, the spring prestressing may also be adjustable.

Instead of the eyelet 50 or the clamping jaws 49 in the embodiments shown in FIGS. 26 to 29, a latchable, elastically widenable constricting device is also conceivable, for example by clipping together two parts which are of identical design and are provided with latching hooks and latching openings.

In FIGS. 26 to 29, the insert 54 may also comprise a rubber or a rubber-sheathed metal or plastic core, which is pinched into an oval shape by the tensile forces, which rise in the surround element 4 at higher rotational speeds, on account of the rising mass forces of the valve. This likewise leads to an elastic increase in the distance between the axis of rotation 8 and the pivot axis 15 of the valve actuator 10.

Figure 30:
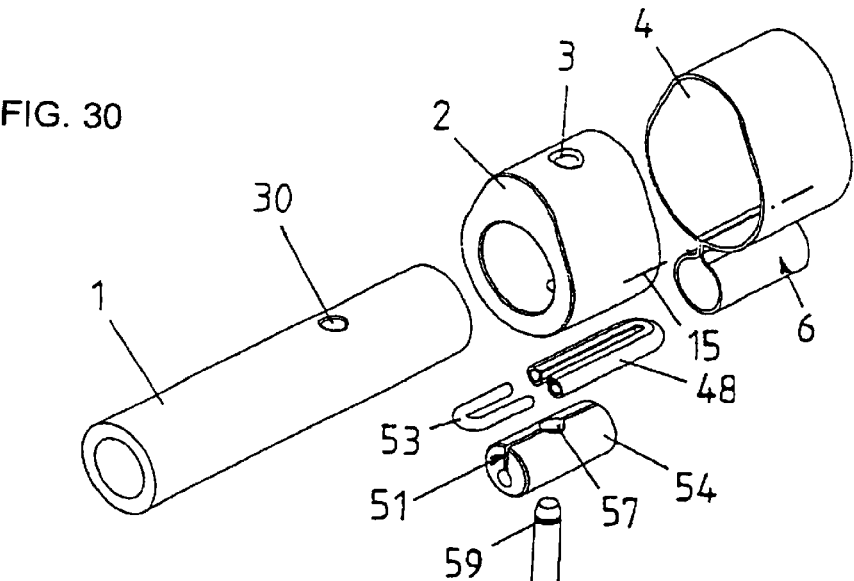
FIG. 30 shows a perspective view of components of an eleventh embodiment.
Figure 31:
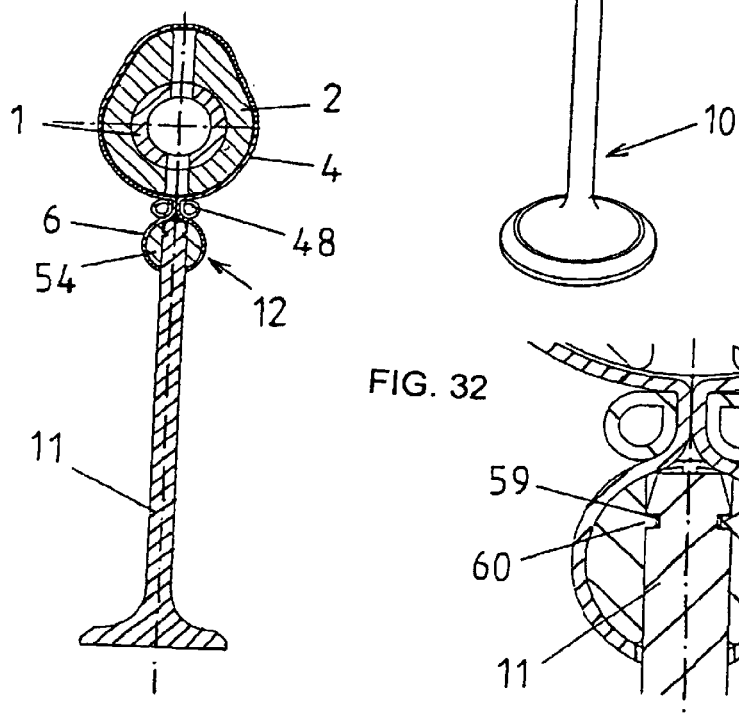
FIG. 31 shows a cross section through the eleventh embodiment.
Figure 32:
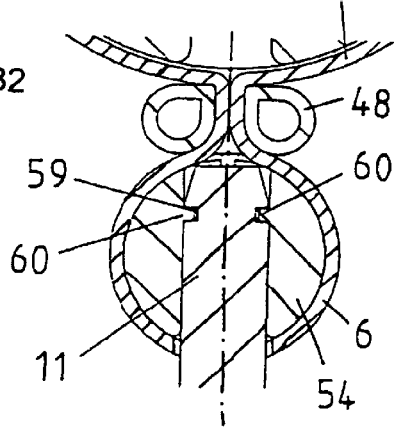
FIG. 32 shows an enlarged detailed view of part of FIG. 31.

FIGS. 30 to 32 show a possible way of producing a latching connection between the valve stem 11 and the holder 12, which allows the valve stem 11 to rotate about its axis. The end of the valve stem 11 is provided with a polygonal, conical or rounded annular groove 59, and the insert 54 is provided with two webs, which are resilient on account of a slot 51 and on which polygonal, conical or rounded ribs 60 are formed. The valve stem is pushed into the bore 57, so that the insert 54 is widened, until the ribs 60 latch into the annular groove 59 (FIG. 32). The connecting element 48, which is responsible for the constriction and is in the form of a U-shaped hollow bracket, is then pushed on and secured by the U-shaped mating piece 53, which is adhesively bonded or pinched in place. In FIGS. 26 to 32, the constriction in each case forms an elastic, flexible connection, wherein the axis 15 is embodied.

Figure 33:
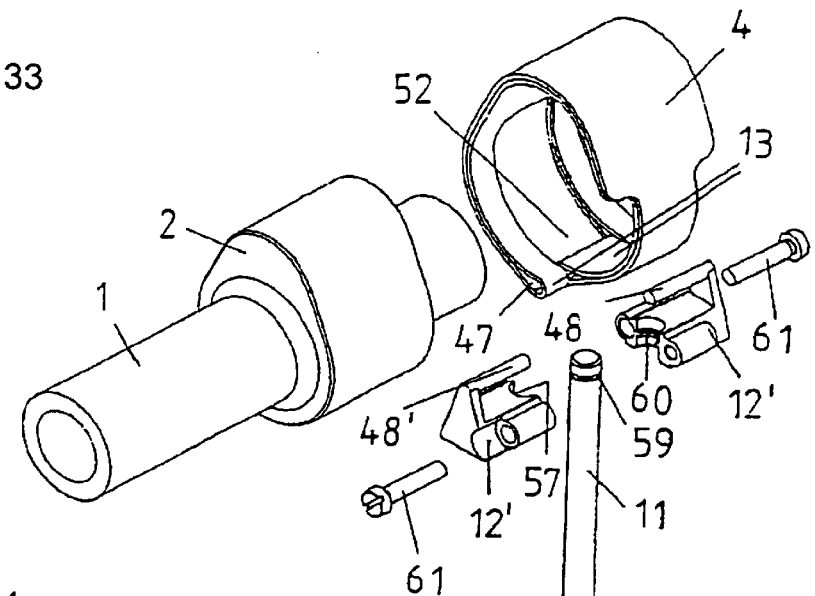
FIG. 33 shows a perspective view of components of a twelfth embodiment.
Figure 34:
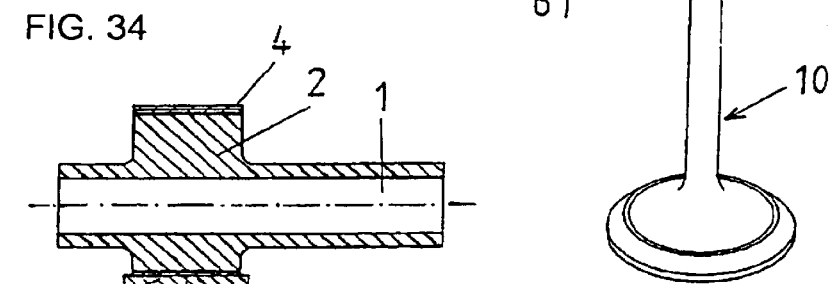
FIG. 34 shows a longitudinal section through the twelfth embodiment.
Figure 35:
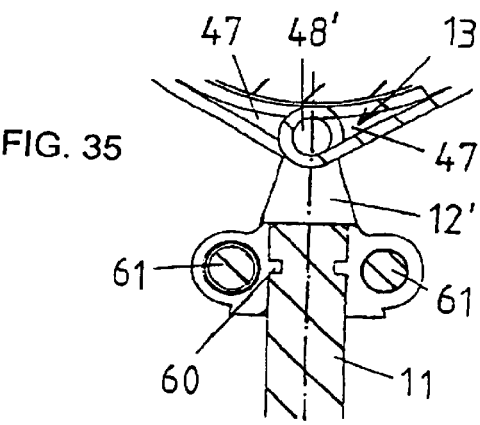
FIG. 35 shows an enlarged detailed illustration of part of the twelfth embodiment.

FIGS. 33 to 35 show an embodiment wherein the surround element 4, in a similar manner to the embodiment shown in FIGS. 20 to 23, comprises a continuous strip of an elastically stretchable woven fabric which is laid together so as to form an open, two-layer loop and the reversal points of which once again form plug-in openings 47. The ends 13 of the open loop are cut out in such a way that they can be fitted into one another. In this embodiment, the holder 12 is assembled from two parts 12' each of which has a pin-like section 48' of the connecting element 48, a receiving part and a threaded sleeve for a threaded screw 61. Two ribs 60, which engage in a circumferential groove 59 in the valve stem 11, which is once again held rotatably, project into the opening 57, which is likewise divided. The two pin-like sections 48' engage in the mutually aligned plug-in openings 47 in the mutually engaging ends 18 and come into contact with one another in the center, as can be seen from FIG. 34. In this embodiment, the cam element 2 is not shown as a part which can be mounted individually, but rather the cam shaft is produced as a single part using a conventional process.

Since the variable forced guidance of the valve actuator allows the valve mechanism to be of very lightweight design, it is also possible for the entire camshaft to be of very lightweight design. Therefore, it can even be produced in a single piece from an optionally reinforced plastic or other lightweight materials.

FIGS. 36 to 39 illustrate a first embodiment in which the lengthening of the surround element 4 does not lead to an enlargement of a gap between the eccentric region of the cam element 2 and the connection region of the valve actuator 10, because the cam element is also enlarged, i.e. increased in size.

The cam element 2 consists of two cam parts 70, 71. The cam part 70 has a cylindrical base shape and a central window 75 including slightly less than half of the circumference, whereby two cam regions 43 with a circular outer outline remain on both sides. A camshaft 64, which rotates with the support shaft 1, is axially displaceable in the support shaft 1. In the region of each cam element 2, the camshaft 64 includes a control section 66 with an axially increasing inclined surface 67. The second cam part 71 of the cam element 2 which also has an inclined surface 72 contacts the inclined surface 67 which is exposed in the window 75, the second cam part being guided in the window 75 between the lateral cam regions 43 and carrying the eccentric valve control surface at the circumference. FIGS. 37 to 39 show different positions. In FIG. 37 the camshaft 64 is shifted so far to the left that the second cam part 71 reaches its lowest position where it lies within the circular outer outline of the first cam part 70. In this position the rotation of the cam element 2 which does not have an eccentricity also does not result in a valve lift and the valve actuator 10 being guided in a guide sleeve 41 of the cylinder block 80 or the like remains in the closed position and the surround element 4 is not lengthened. The corresponding cylinder of the internal combustion engine is thus turned off.

When the camshaft 64 is shifted towards the right by an operating mechanism (arrow 81), a normal stroke position is provided in a position according to FIG. 38, which is advantageous for example for the idling speed or a lower speed range, whereby the second cam part 71 has been pushed radially outwardly. The surround element 4 is lengthened to a certain degree in part by pushing the cam part 71 outwardly and in part by the tensile forces in the direction of the valve shaft 11 which are in effect even at idling speed, whereby the increase in distance between the axis of rotation 8 and the holder 12 corresponds to the extent of a "push-out" of the cam part 71. Without the actively effected expansion of the surround element 4 which is effected by shifting the camshaft 64, the transition from the no-stroke position in FIG. 37 to the normal stroke position according to FIG. 38 is not possible, because the stationary valve actuator 10 does not exert tractive forces on the surround element which result from the rotation of the support shaft. A further shift of the camshaft 64 in the direction of the arrow 81 transfers the cam part 71 into the auxiliary stroke position of FIG. 39 wherein the uppermost region of the inclined surface 67 is reached. The surround element 4 is elongated to its maximum length and contracts when the camshaft 64 is shifted back.

In the embodiment according to FIGS. 40 and 41, a rotatable camshaft 65 for the radial movement of the cam part 71 is provided in the support shaft 1, the control region of which is formed by a crankpin-shaped element 68 with an eccentric control surface 69 which inclines eccentrically in a spiral-shaped manner. The course of the adjusting of the cam part 71 can be seen from a comparison of the two FIGS. 40 and 41, when the camshaft 65 is rotated in the direction of the arrow 82. In the pushed-out position according to FIG. 41, the cam element 2 is supported by the element 68 of the camshaft 65. When the camshaft 65 is rotated back counter-clockwise in the support shaft, the cam part 71 located at the spiral control surface 69 once again moves inward until the zero-stroke position according to FIG. 40 is reached. In this position, the cam part 71 is located within the cylindrical outer surface of the cam part 70 so that the contracted surround element 4 is located completely around the cam part 70.

Due to the elasticity of the surround element 4, it can be advantageous when the element contains stiffenings in the transverse direction, i.e. axial direction of the support shaft 1, for example in the shape of reinforcement ribs 63 comprising pins inserted or bonded into the surround element 4, for example. The transverse stiffenings prevent that non-supported parts of the surround element 4 get pulled into free spaces 73 of the cam element 2 resulting from the engaging of the two cam parts 70, 71.

The embodiments according to FIGS. 42 and 43 show a second cam part 71 carrying the eccentric valve control surface, being pivotably mounted at the first cam part 70 about an axis of rotation 8 parallel to the axis 77. The second cam part 71 has a guide surface 78. The pivoting takes places via a crankpin 76 of the support shaft 1 that pivots the second cam part 71 from the no-stroke position according to FIG. 2 up into the auxiliary stroke position according to FIG. 43 by lengthening the surround element 4 (arrow 83). The valve control surface located within the circular peripheral outline of the cylindrical first cam part 70 according to FIG. 42 gives an asymmetrical shape to the cam element 2 so that other opening and closing characteristics of the valve are given for each amount of stroke or lift. The selection of the arch shape of the cam part 71 preferably gives a position in which the cam element 2 is symmetrical.

If a woven-fabric strip is used for the surround element 4, its ends can either be sewn, adhesively bonded or welded together to form a continuous loop, or can be wrapped around and sewn, adhesively bonded or welded, in order to form plug-in openings 47 of the open loop. The windows 5 or edge and center cutouts 52 can readily be formed in a woven fabric which has been treated in this manner.

A holder 12 as shown in FIGS. 8 to 10 or 26 to 35 is preferably formed from inelastic material, so that an elastically stretchable surround element 4 or an elastically widenable constriction of the surround element 4 is provided for the purpose of changing the distance between the axis of rotation 8 of the support shaft 1 and the articulation axis 15 of the valve actuator 10.

However, it is also possible for the holder 12 to consist of an elastically stretchable, rubber-like material, which can in particular be permanently adhesively bonded or vulcanized onto a woven-fabric strip or its ends. The rubber-like material, which is preferably of varying thickness according to the stress profile, effects damping of the surrounding squeezing movement in the surround element 4 which is produced by the cam peaks and good transfer, without stress peaks, of the shear forces from the surround element 4 to the valve actuator.

As has already been mentioned, the surround element may be composed of an elastically stretchable material and a substantially nonstretch material. In this connection, embodiments wherein the elastically stretchable region is provided opposite the holder 12 are also possible, with the result that any weakening in the connecting area between the valve actuator and the surround element 4 is avoided. A design of this type is illustrated in FIG. 24, wherein the region of the surround element 4 which lies opposite the opening 5, between the dashed lines, can stretch elastically.

In all embodiments, the valve mechanism is shown with a valve lifter as valve actuator 10. However, the valve actuator 10 may equally well comprise a pivotably mounted rocker or drag lever, on one end of which the surround element 4 is arranged in such a manner that it can pivot about the axis 15. A camshaft for use with internal combustion engines usually has a plurality of valve mechanisms of this type, wherein the cam elements are arranged in an angularly offset manner.

I claim:

1. A valve mechanism, comprising:
at least one driven cam element and a valve actuator driven by said cam element;
a flexible surround element, said cam element being rotatably disposed in said flexible surround element about an axis of rotation and said flexible surround element being movably connected to said valve actuator for movement in a plane perpendicular to said axis of rotation of said cam element, and wherein said surround element is configured to be reversibly lengthened for adjusting a valve lift of said valve actuator.

2. The valve mechanism according to claim 1, wherein said surround element is composed of two different materials, and at least one of said materials is an elastically stretchable material.

3. The valve mechanism according to claim 1, wherein said surround element consists of an elastically stretchable material.

4. The valve mechanism according to claim 1, wherein said surround element is formed of at least one elastically stretchable material, and a stretch-limiting device is assigned to said elastically stretchable material.

5. The valve mechanism according to claim 4, wherein the mechanism is disposed to drive a valve of an internal combustion engine having a given maximum rotational speed, and said stretch-limiting device is active at approximately 60%–70% of the maximum rotational speed of the internal combustion engine.

6. The valve mechanism according to claim 1, wherein said surround element includes a strip comprising a textile-bound sheet material having two ends connected to a holder for said valve actuator.

7. The valve mechanism according to claim 6, wherein said two ends of said strip are formed with plug-in openings for a connecting element.

8. The valve mechanism according to claim 7, wherein said two ends of said strip which are provided with plug-in openings are formed with cutout regions engaged inside one another.

9. The valve mechanism according to claim 7, wherein said strip comprises a continuous loop guided backward and forward about said cam element and having reversal points forming said plug-in openings.

10. The valve mechanism according to claim 6, wherein said surround element has a nonstretch region, said sheet material is a woven fabric containing filaments of aramid fibers extending in a circumferential direction of said cam element, and said holder consists of an elastically stretchable material.

11. The valve mechanism according to claim 1, wherein said surround element comprises a seamless, continuous sheet material produced in a textile circular working process and provided with a holder for said valve actuator.

12. The valve mechanism according to claim 6, wherein said textile-bound sheet material is adhesively bonded to said holder.

13. The valve mechanism according to claim 1, wherein said cam element is formed with a central circumferential groove and said surround element is an elastically stretchable cord laid into said central circumferential groove in said cam element.

14. The valve mechanism according to claim 13, wherein said cord is guided through an eyelet formed in said valve actuator.

15. The valve mechanism according to claim 1, wherein said surround element is an elastically stretchable plastic ring.

16. The valve mechanism according to claim 15, wherein said plastic ring is formed with a recess, and a bearing pin of said valve actuator is disposed in said recess.

17. The valve mechanism according to claim 1, wherein said surround element has an elastically stretchable region including filaments of aramid fibers extending in a circumferential direction of said cam element and serving as a stretch-limiting device.

18. The valve mechanism according to claim 1, wherein said surround element has an elastically stretchable region formed from a material with a modulus of elasticity of between 1 and 4000 N/mm$^2$.

19. The valve mechanism according to claim 18, wherein the modulus of elasticity is between 600 and 2000 N/mm$^2$.

20. The valve mechanism according to claim 1, wherein the mechanism is disposed to drive a valve of an internal combustion engine having a given maximum rotational speed, and the elastically stretchable material is designed for an additional valve lift of 10% to 30% of the valve lift at idling speed of the internal combustion engine.

21. The valve mechanism according to claim 1, wherein said surround element has a protuberance formed by an elastically resilient constriction and wherein a holder for said valve actuator is arranged.

22. The valve mechanism according to claim 21, wherein said constriction is formed by two clamping jaws that are externally stressed with respect to one another.

23. The valve mechanism according to claim 21, wherein said constriction is formed by an elastically deformable eyelet.

24. The valve mechanism according to claim 1, wherein said surround element has one of the following three configurations: the surround element includes a strip comprising a textile-bound sheet material having two ends connected to a holder for said valve actuator, said surround element comprises a seamless, continuous sheet material produced in a textile circular working process and provided with a holder for said valve actuator, and said surround element has a protuberance formed by an elastically resilient constriction and wherein a holder for said valve actuator is arranged, and wherein said holder is composed of two parts enclosing said valve actuator.

25. The valve mechanism according to claim 24, wherein said valve actuator is arranged on said holder to be adjustable in length.

26. The valve mechanism according to claim 24, wherein said valve actuator is rotatably arranged in said holder.

27. The valve mechanism according to claim 1, wherein a feed opening for a friction-reducing medium is formed in one of a circumferential surface of said cam element and an inner surface of said flexible surround element.

28. The valve mechanism according to claim 27, which comprises a hollow support shaft supporting said cam element and having at least one bore formed therein, and wherein, for an internal supply of the friction-reducing medium, said cam element is formed with at least one bore that extends radially with respect to the axis of rotation and is aligned with said at least one bore in said support shaft.

29. The valve mechanism according to claim 28, wherein said cam element is formed with a central circumferential groove and said surround element is an elastically stretchable cord laid into said central circumferential groove in said cam element, and wherein said feed opening for the friction-reducing medium is formed in said circumferential groove in the cam element.

30. The valve mechanism according to claim 1, which comprises a support shaft supporting said cam element, wherein said cam element is fixed on said support shaft against twisting with a pin inserted into bores in said cam element and said support shaft.

31. The valve mechanism according to claim 1, wherein:
said surround element has a length; and
said cam element has a circumference variably adjustable in correspondence with said length of said surround element.

32. The valve mechanism according to claim 31, wherein:
said cam element has a cam circumference surface with a cylindrical region and an eccentric region;
said cam element has a first cam part and a second cam part, said first and second cam parts are movable relative to one another; and
said first cam part includes said cylindrical region of said cam circumference surface, said second cam part includes said eccentric region of said cam circumference surface.

33. The valve mechanism according to claim 32, including:
a support shaft defining a longitudinal direction;
a camshaft having an inclined camshaft surface, said camshaft being movable along the longitudinal direction in said support shaft;
said second cam part being guided in said first cam part and being configured to be pushed radially outwardly; and
said second cam part having an inclined surface cooperating with said inclined camshaft surface.

34. The valve mechanism according to claim 32, including:
a support shaft;
a camshaft having a spiral-shaped control surface, said camshaft being rotatable in said support shaft;
said second cam part being guided in said first cam part and being configured to be pushed radially outwardly; and
said second cam part having a bridge cooperating with said spiral-shaped control surface of said camshaft.

35. The valve mechanism according to claim 32, including:
a support shaft defining an axis of rotation;
a camshaft having a crankpin and being rotatable in said support shaft; and
said second cam part being disposed at said first cam part and being pivotable about an axis parallel to the axis of rotation, said second cam part having a guide surface cooperating with said crankpin.

* * * * *